Jan. 21, 1936.    I. M. CLAUSEN    2,028,273
FLOW MEASURING DEVICE
Filed Oct. 3, 1933    3 Sheets-Sheet 2
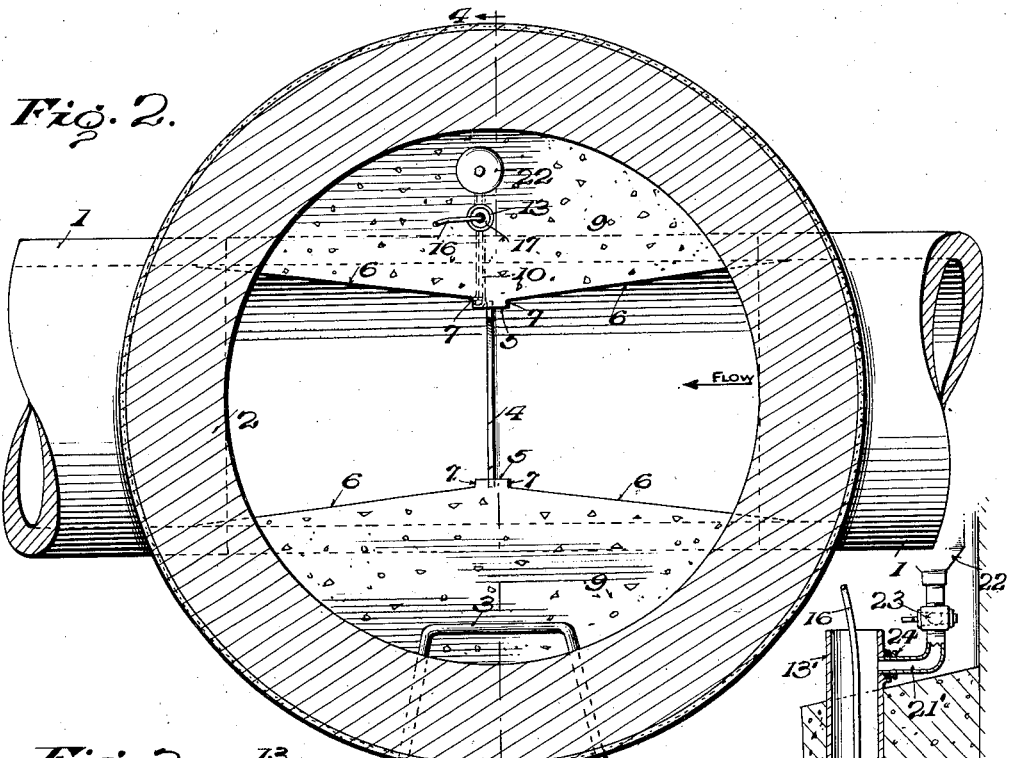
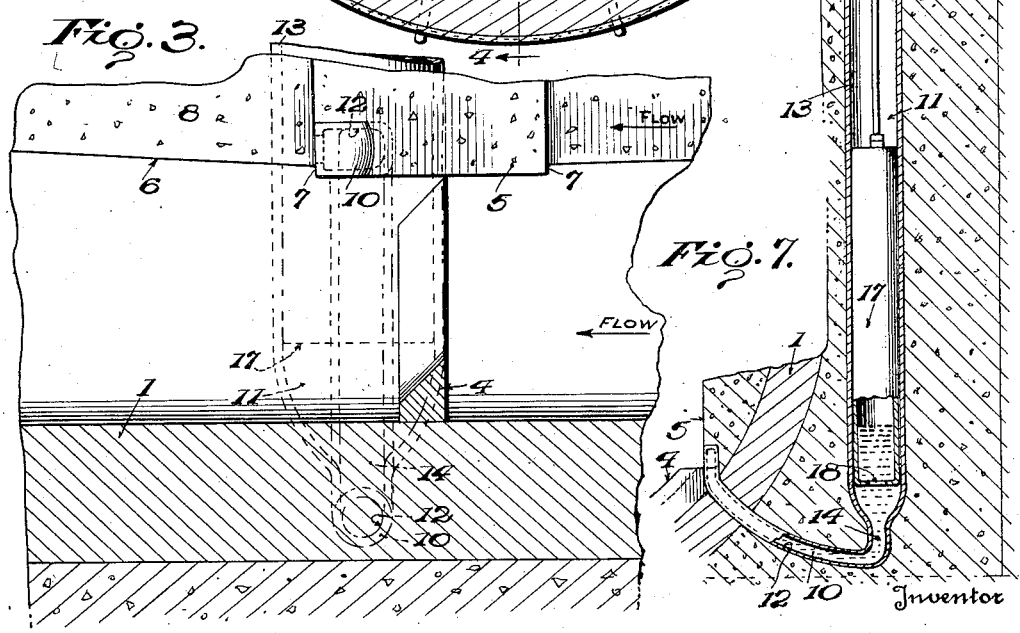
Inventor
Ingard M. Clausen
By Cameron, Kerkam & Sutton
Attorneys

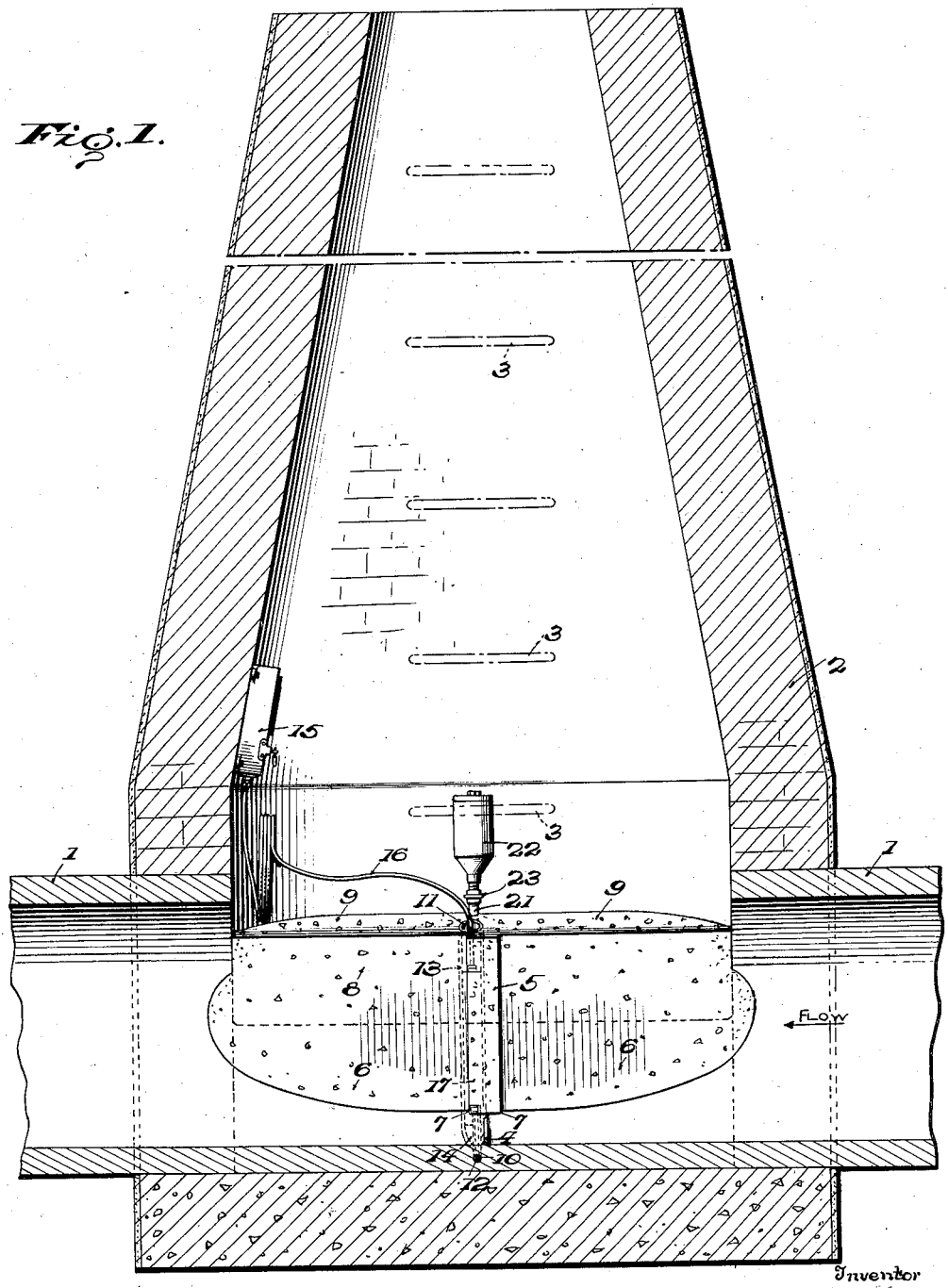

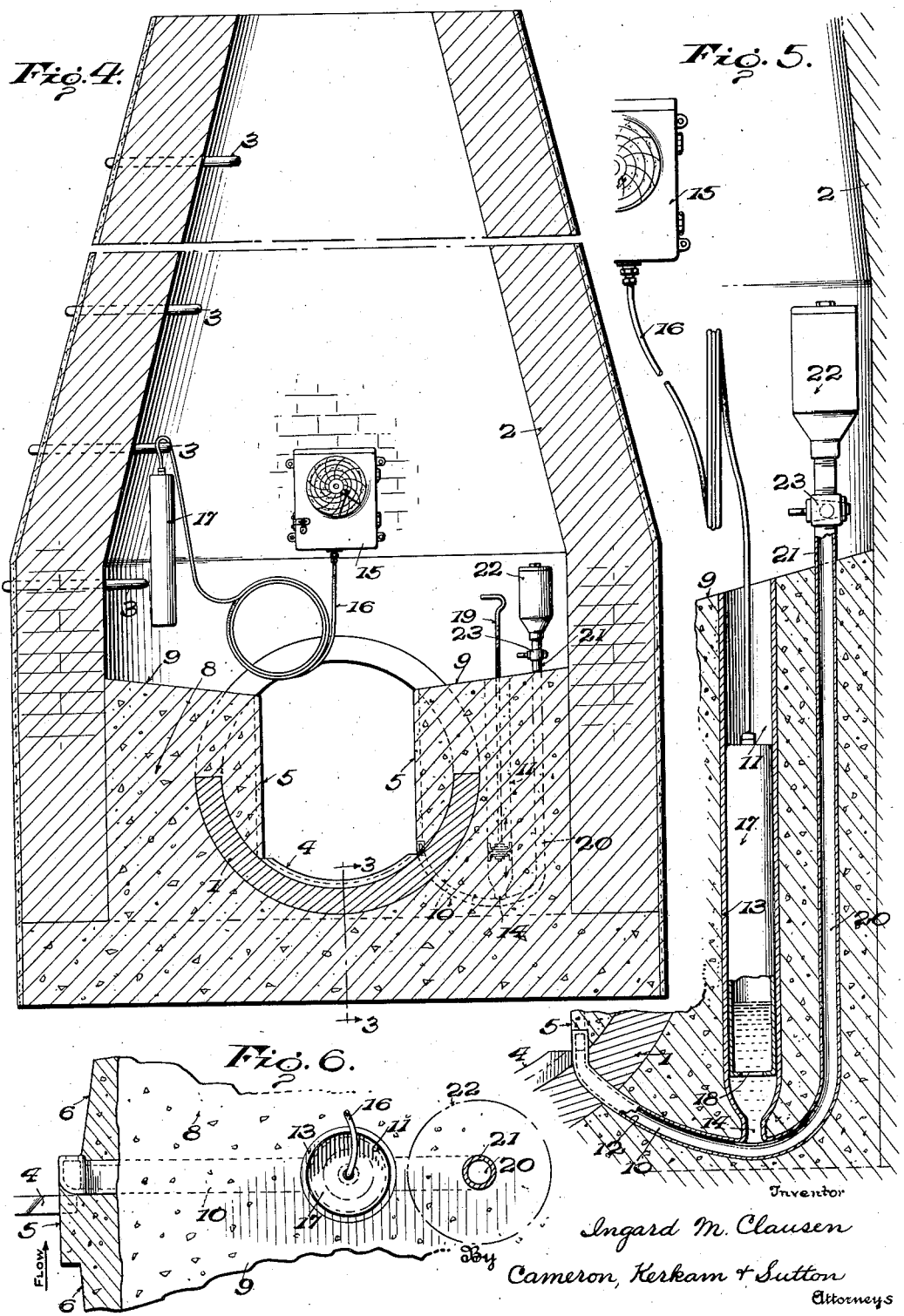

Patented Jan. 21, 1936

2,028,273

UNITED STATES PATENT OFFICE 2,028,273

FLOW MEASURING DEVICE

Ingard M. Clausen, Phoenix, Ariz.

Application October 3, 1933, Serial No. 692,021

20 Claims. (Cl. 73—167)

This invention relates to means for measuring the flow or discharge, through conduits which are not under pressure, or gravity flow lines as distinguished from pressure lines, and more particularly to means for measuring the flow of water, sewage, etc. in gravity flow lines. This application is a continuation in part of my prior application Serial No. 635,252, filed September 28, 1932.

Gravity flow lines are employed in hydraulics for many purposes. For example, sewage systems, storm sewers, infiltration galleries of water systems, etc., usually operate by gravity. As is well known, the flow of fluid through such systems is subject to great fluctuation. For example, a storm sewer may be taxed to its full capacity during a violent storm while during an extended drought the flow may become very small. Similarly, in sewage systems there is a great variation in the quantity of sewage at different hours during the day and night and this variation has a material influence on the capacity and arrangement of the collection system. Consequently the conduits of such systems almost always run less than full and the liquid flows freely by gravity alone, the conduit not being under pressure except that on the bottom and sides due to the weight of the liquid. Further, such systems are open to the air at many points of collection, such as street intersections and the like. In designing sewage systems, it is customary to consider two periods of fluctuation, namely, the daily fluctuations during the year which give what is known as the day maximum and the hourly fluctuations during the day which give what is known as the hour maximum. In order to operate such a system properly and to secure data from which it is possible to plan future extensions, it is very desirable to be able to determine the hourly and daily quantities of flow throughout the entire year or any part thereof. The same problems are involved in other gravity flow lines employed in water systems and the like.

Heretofore no adequate means has existed whereby measurements of volume or quantity of flow, as for example the flow of sewage in a collection system, could be made with any degree of accuracy or for a reasonable cost. The ordinary flow measuring devices such as Venturi tubes and orifice plates operate on principles involving the determination of pressure at different points, and hence they are adapted only for measuring flow in pipes in which the conduit runs full and the liquid is under pressure, as distinguished from conduits in which the liquid flows freely by gravity and the conduit normally runs less than full and is not under pressure. The most common method heretofore used has been to determine the volume of flow by calculating or computing the discharge using some standard formula for the flow of water in a pipe in which it is necessary to introduce a factor of personal or individual judgment in the selection of necessary coefficients. Another method which has been used is to install temporary free flowing weirs in the line which must be removed in the shortest possible time. Both of these methods are subject to a great many inaccuracies. It has heretofore been impracticable to install a permanent flow measuring device in such gravity flow lines, despite the desirability and advantages of such an installation, due largely to the accepted fact that no obstruction in the line can be permitted which will create eddies or dead water areas in which solids will settle or offer sharp corners or edges on which solids can hang. It is also necessary that such a device, if it is to be permanently installed, shall offer no substantial obstruction to flow so as to cause a material loss of head in the line.

One of the objects of the present invention is to provide a novel flow measuring device that is adapted for permanent installation in gravity flow lines without causing any material loss of head or deposits of solid material in the line.

Another object is to provide a flow measuring device for gravity flow lines which is inexpensive to build and install, which requires no maintenance, adjustment or supervision, and which is substantially always available to determine the discharge through the pipe at any instant.

A further object is to provide novel means for measuring the flow through a gravity flow line which means operates on the principle of the submerged weir.

Another object is to provide a novel submerged weir which is capable of permanent installation in a pipe line and is constructed and arranged so that substantially no obstruction of the flow or reduction in velocity of the flow is caused.

A still further object is to provide a submerged weir so constructed and arranged that it is particularly adapted for installation in a pipe having a cross section other than rectangular, such as circular, oval, egg-shaped, etc.

Other objects include the combination with the novel submerged weir of means whereby a continuous record may be kept indicating the volume of flow over the weir and the provision of means whereby antiseptic fluid may be mixed with the liquid.

As above indicated, flow measuring devices embodying the present invention operate on the principle of the submerged weir and the discharge past such a device can be determined according to well known methods for determining the flow over any submerged weir. For example, the flow can be calculated from the well known submerged weir formula:

$$Q = CA\sqrt{2GH} + \tfrac{2}{3}CL\sqrt{2G}H^{3/2}$$

In the above formula the letter Q denotes the discharge over the weir, the letter C denotes empirical coefficients, the letter A is the area of the theoretical orifice as explained below, the letter G is the acceleration due to gravity, the letter H denotes the head, and the letter L is the length of the weir.

As will be understood, the two factors of this formula represent the division of the total quantity of water discharged over the weir into two parts, one of which represents the flow through a theoretical orifice extending above the weir crest to a point which is at the same height as the down-stream head above the crest of the weir (or the height of the static head at the weir), and the other of which represents the flow of a free flowing weir having a theoretical crest at the top of the theoretical orifice. Another method which can be used to determine the quantity of water discharged over the weir is that disclosed and claimed in the patent to Ingard M. Clausen and Ralph A. Pierce, No. 1,735,953, this method being preferably practiced by the use of the weir rule disclosed and claimed in said patent or of the weir rule disclosed and claimed in the patent of Ingard M. Clausen and Ralph A. Pierce, No. 1,735,892. Any other suitable method for determining the discharge of water over a submerged weir can be employed instead of those referred to above.

For the purposes of the present invention, a submerged weir must, as indicated above, be designed so that it does not offer too much obstruction to the flow of water through the pipe in which it is installed. Hence the weir crest when used in a pipe line must not be so high as to obstruct the flow of water in the bottom of the pipe to the extent of materially reducing the velocity of flow in the pipe and causing deposits of solid material which build up and not only cut down the maximum discharge through the pipe but also interfere with the efficiency of the weir as a measuring device. Moreover, in pipe lines which usually have a cross section other than rectangular, the straight vertical ends of the weir which are necessary in order for the application of known weir measuring formulae and devices tend to produce similar obstruction of the flow through the pipe and to cause eddies and dead areas in which solid materials can deposit. While a low horizontal weir crest may be suitable in some instances in a device embodying the present invention, the crest preferably corresponds in configuration with the adjacent section of the pipe in which it is installed, whether the pipe be circular, oval, egg-shaped, etc., and projects a minimum distance from the normal surface of the pipe such that it does not materially obstruct the flow. Moreover, the vertical ends of the weir are provided on both the upstream and downstream sides of the weir with transition sections whereby the curved sides of the pipe are merged smoothly and continuously into straight vertical form at the weir. The combination of these means results in a measuring device which can be installed permanently in the pipe line without offering substantial obstruction to the flow, without causing any material loss of head, and without creating eddies, dead spots or sharp corners which might cause deposits of solid material to form in the pipe.

One embodiment of the invention is illustrated in the accompanying drawings, but it is to be expressly understood that the drawings are for purposes of illustration only and are not to be construed as a definition of the limits of the invention, reference being had to the appended claims for this purpose.

In said drawings,

Fig. 1 is a vertical sectional view showing a typical gravity flow pipe and manhole construction embodying the invention;

Fig. 2 is a plan view of Fig. 1, the upper portion of the manhole structure being removed;

Fig. 3 is a sectional view taken on the line 3—3 of Fig. 4;

Fig. 4 is a sectional view taken on the line 4—4 of Fig. 2;

Fig. 5 is a vertical sectional detail view of a portion of the structure including the antiseptic device;

Fig. 6 is a plan view of the structure shown in Fig. 5; and

Fig. 7 is a vertical sectional view of another arrangement of the antiseptic device.

The drawings show a gravity flow pipe 1 of circular cross section which passes through a typical manhole structure 2 having a lower cylindrical portion and an upper tapering portion and constructed of brick, masonry, concrete, etc. The upper end of the manhole (not shown) is as usual open to the atmosphere, whether for entry of liquid or to permit access of workmen to the pipe 1, or both, the usual steps 3 being provided on the wall of the manhole. The pipe 1 is also of any suitable material such as cast iron, wrought iron, or other metal, or wood, concrete, etc. As shown, the upper half of the pipe 1 is removed between the sides of the manhole, the pipe being open at the top. It is to be understood, however, that the pipe 1 may have any suitable cross section other than circular, and that a device embodying the invention need not necessarily be installed in a manhole but may be located at any other convenient point in the pipe. Further it is not necessary to remove the entire upper half of the pipe, the opening being, if desired, only large enough to permit access to the weir, and in some instances removable covers may be desirable. Moreover, the manhole construction per se constitutes no part of the present invention.

In the form shown, the weir crest is formed by a member 4 of any suitable material and secured in any suitable way to the bottom of the pipe, said member having a crest configuration which is similar to the cross-sectional form of the adjacent inner surface of the pipe as clearly shown in Fig. 4. The member 4 is of slight extent in a direction normal to the inner surface of the pipe 1 so that it causes little or no obstruction to the flow of fluid through the pipe and little or no decrease in the velocity of the fluid flowing along the bottom of the pipe. It has been found possible to employ a weir member which is of such small extent normal to the inner surface of the pipe that it causes no objectionable results under any conditions which exist in the pipe, even though permanently installed therein.

At the ends of the member 4, or in other words at the ends of the weir, vertical ends 5, 5 are formed in any suitable way by members preferably secured permanently to the sides of the pipe 1. On each side of each of the members 5, transition sections 6 are employed which as shown in Figs. 1 and 2 are so designed as to merge the curved sides of the pipe 1 smoothly and continuously into the vertical ends 5 of the weir. The members 5 and the transition sections 6 may be made of any suitable material and in one or several pieces as may be desired, the whole being firmly and tightly fitted and secured to the sides of the pipe 1. The transition sections can be arranged to meet the members 5 smoothly or, as shown in Fig. 1, a small amount of end contraction can be provided for the weir by the shoulders or offset portions 7 intermediate the members 5 and the transition sections 6. These end contractions are desirable for refinement of measurement without modification of the submerged weir formula set forth above or of the calibration of the weir rules disclosed in the aforesaid patents.

In manhole constructions, it is customary to set the pipe in a bed of concrete or the like which fills in the remaining space at the sides of the pipe, and in the form shown, this mass of concrete or other suitable material is shaped so as to form the ends 5 of the weir and the transition sections 6 and shoulders 7. As shown in the drawings, particularly Figs. 2 and 4, the half-section of the pipe 1 is embedded in a mass of concrete 8 which fills in the manhole at the sides of the pipe and extends upwardly in the manhole to approximately the level of the upper surface of the pipe, forming a shelf 9 on each side of the pipe. This mass of concrete is extended inwardly within the pipe and is molded to form the vertical ends 5 for the weir, the transition sections 6, and the shoulders 7. In case only a part of the upper half of the pipe 1 is removed, for example, that part between the vertical ends 5 or less, the ends 5 and transition sections 6 can be cast separately from the concrete bed 8, or can be made of wood, metal or other suitable material and secured in the pipe in any suitable way. The same considerations apply to the formation of the weir member 4. In case the pipe itself is of concrete, a section of the pipe can be cast integrally in the desired form to provide the weir costruction. Any other suitable method of constructing and installing the various members may be employed.

The vertical height or thickness of the weir member 4 must, as stated above, be such that it offers no substantial obstruction to the flow of water through the pipe and to this end is usually made as small as possible. Generally, the height of the weir member should be approximately one-fourth of the total rise of the segment subtended by the weir member 4. For example, in a pipe two feet in inside diameter and a weir having a length of about two-thirds of the pipe diameter, the vertical height of the weir member 4 should be approximately one-half inch. This dimension is given for purposes of illustration only and is not to be considered as restrictive in any sense as the length of the weir and the height of the weir member may vary without materially interfering with the efficiency of the apparatus as a measuring device. The principal factor to be considered in connection with the height of the weir member is obstruction to the flow and the permissible height will vary under different conditions such as the nature of the flow through the pipe, the kind and amount of solid material carried thereby, etc. The thickness of the weir member in a horizontal direction parallel to the axis of the conduit may also vary widely, but under ordinary conditions a thickness of one-half inch is suitable. Further, the top of the weir member 5 may be either flat or bevelled at a suitable angle such as 45° to form a sharp crested weir, the sharp edge being on the upstream side as shown in Fig. 3.

The length of the member 4 (or in other words the weir length) is also capable of considerable variation. By way of example, it is satisfactory that the horizontal distance between the vertical members 5 shall be approximately two-thirds of the diameter of the pipe. However, this dimension can be changed to any fractional part greater or less than two-thirds of the pipe diameter such as one-half of the pipe diameter. The proportion of two-thirds of the pipe diameter is generally preferable in a circular conduit because it provides a minimum of contraction and still permits of a flow over the weir of approximately 87% of the vertical dimension of the conduit before overflowing the weir section. It will be observed that if ends 5 of the weir are moved inwardly toward one another, the contraction in the area of the conduit will be increased and at the same time the depth of flow which can be permitted without overflowing the weir section is increased. If the weir length is increased, the reverse takes place, the contraction of the area of the conduit being decreased but at the same time the depth of flow which can be permitted without overflowing the weir section being decreased. These principles can be applied to any particular situation and the most satisfactory dimension selected.

It may also be desirable temporarily to use a much greater constriction of the cross-sectional area of the pipe, as for example in a conduit built larger than necessary for immediated requirements in order to provide adequately for future needs. In such cases the flow will be small in proportion to the size of the conduit, and by way of illustration, a weir having a horizontal length of 18 inches or even less may be used in a 36 inch pipe, or a weir 16 inches in length may be used in a 24 inch pipe with good results. Under conditions of greater flow, however, longer weirs may be desirable.

The end contraction provided by the shoulders 7 is employed to obtain refinement of measurements and is desirable in order that the same calibration of the weir rule may apply equally to weirs embodying the present invention and to ordinary weirs. The amount of end contraction can be varied considerably in so far as the operation of the weir is concerned, the only requirement being that no material obstruction shall be offered to the flow through the pipe. For example, the shoulders 7 may have a depth of approximately one-fourth of an inch but are preferably one-half of an inch. The width of the members 5 longitudinally of the pipe is also capable of variations, and said members may for illustration have a dimension parallel to the axis of the pipe of three inches. It will be understood that the governing considerations with respect to the dimensions of the weir member, the members 5, and the shoulders 7 are the matter of obstruction to the flow, resulting in loss of head and possibly in deposits of solid material, and the matter of the coefficients to be used in the weir formula or in the calibration of the weir rule, these considerations being independent of the operation of the device as a weir.

The same considerations hold true with respect to the size and shape of the transition sections 6. The length of these sections on either side of the ends of the weir can be varied within wide limits without impairing the accuracy of the weir and the considerations which control the length of these sections are primarily the prevention of obstruction of the flow and conditions of manufacture and installation. The angle made by the plane of the transition sections with a plane through the pipe axis should preferably be small, for example, in the neighborhood of 8°, and small variations in this angle will cause considerable variations in the length of the transition sections. In the case of the 24 inch pipe and weir referred to above, the transition sections therefore extend approximately three or four feet on each side of the weir crest, a small increase in length making litttle difference in the angle. It will also be understood that the shape and size of the transition sections and of the vertical members 5 depend to a considerable extent on the cross-sectional form of the pipe. For example, in a pipe having sides which are of long radius of curvature, the transition sections and vertical end members become thinner and less important. It will be observed that a pipe made with flat parallel sides and a rounded bottom would require no transition sections and no provision of vertical members corresponding to the members 5 except for the purpose of providing end contraction.

The cross-sectional form of the weir opening is clearly shown in Fig. 4. In applying the formula set forth above to such a weir, that portion of the weir opening which is considered as a theoretical orifice consists of two parts. The lower portion of the weir opening comprises substantially a segment of a circle, the circumference of which is formed by the weir crest and the chord of which may be represented by a horizontal line between the ends of the weir member 4. The area of this segment is determined at the time of installation of the weir and will remain at all times the same. A second portion of the weir opening is rectangular in shape and extends from the top of the segment up to the height of the down-stream head above the crest of the weir (or to the height of the static head at the weir). The sum of these two areas is substituted in the formula for A, representing the area of the hypothetical orifice. Where the flow is very small, an error occurs due to the fact that the formula is based on a theoretical orifice of rectangular shape, whereas a portion of the theoretical orifice is actually a circular segment. Hence in computing the factor A, 85% of the actual area of this segment should be used instead of the total area, which procedure gives accurate results for any flow whether large or small. The remainder of the flow above the theoretical orifice may be considered as a discharge over a free flowing weir as stated above.

With the device as thus far described, measurements of flow may readily be made at any desired time by the use of the submerged weir formula or the weir rule. However, the invention includes means in combination with a suitable recording device whereby one of the variable factors involved in the submerged weir formula may be continuously recorded and thereby a continuous record of the flow over the weir may be made. The two variable factors in the submerged weir formula set forth above are first the so-called down-stream head (or the static head at the weir) which determines the top of the theoretical orifice and second the up-stream head corrected for velocity of approach. For any given installation, however, there exists a corresponding value of up-stream head for any given down-stream head, the conditions at a given weir being substantially the same in every instance of the same flow. Therefore, having once determined a table of flow for varying conditions by the use of the formula or the rule, it is thereafter only necessary to determine the static head at the weir and to refer to the table to obtain the flow.

Acordingly, the invention includes means to measure the static head at the weir combined with a recording device of any suitable type, and preferably these means are built integrally with the manhole, pipe and weir construction described above. In the form shown, a conduit 10 is formed in the mass of concrete 8 which conduit is connected at one end wih a vertical chamber or stilling well 11. The conduit and well may advantageously be formed by positioning pipes 12 and 13 of metal, wood or other suitable material before the concrete is poured. The stilling well 11 extends below the lowermost level of the liquid flowing over the weir and is provided with a constriction or neck 14 where it is connected with the conduit 10. The other end of the conduit 10 passes through the wall of the pipe 1 and extends upwardly at the side of the weir, the extreme tip or end of the conduit being turned horizontally so as to open down stream in order to avoid any pressure due to velocity of flow and also to prevent clogging of the conduit with solid matter. Preferably and as shown in the drawings, the open end of the conduit 10 is positioned at the bottom of the down-stream shoulder 7. It will be seen that the height of liquid in the well 11 is a measure of the static head at the weir, that is, the static pressure independent of velocity of flow.

Any suitable recording device may be employed for measuring and recording either the height of liquid in the well 11 or the pressure of the hydrostatic column in the well at a given point near the bottom of the well. In the form shown, the recording device is of the pressure responsive type and includes a suitable recording gauge 15 secured to the wall of the manhole, a connecting tube 16, and a pressure responsive bulb 17 positioned in the well 11. As shown in Fig. 5, the bulb 17 comprises a cylindrical element connected at one end with the tube 16 and having an opening 18 at its lower end through which the liquid in the well enters the bulb. The pressure in the bulb 17 above the liquid and in the tube 16 and gauge 15 will therefore vary in accordance with the hydrostatic pressure in the well 11. Preferably the bulb 17 is of such size as to fit fairly closely within the well 17, although a fluid-tight fit is not required, and is lowered in the well to such a point that the opening 18 is below the lowest level of liquid flowing over the weir that it is desired to measure. As shown the lowermost position of the bulb is determined by the constriction at the bottom of the well 11.

In order to clean the well, the bulb 17 is removed as shown in Fig. 4 and a suitable plunger 19 or similar device is inserted in the well and pumped up and down until any accumulation of silt or dirt is cleaned out from both the well and the conduit 10.

It may also be desired, particularly where the weir is used to measure the flow in a sewage collection system, to employ means for mixing an antiseptic agent with the liquid in the well 11.

Preferably a liquid chlorinating agent is employed for this purpose, a suitable drip tank filled with the chlorinating liquid being positioned in the manhole in such a way that the drip from the tank is continuously mixed with the fluid in the well. This may be accomplished by means of a connection from the drip tank to the well, either by extending the wall of the well above the shelf 9 and placing the connection above the shelf, or by embedding the connection in the mass 8 and connecting it to the well at a suitable point adjacent the bottom of the well, such as a point immediately below the pressure responsive bulb or at the bottom of the well. In the form shown in Fig. 5, a well 20 formed as an extension of the conduit 10 extends upwardly through the mass of concrete 8 at one side of the well 11, this well 20 also being formed by means of a suitable pipe 21 embedded in the concrete. The upper end of the pipe 21 extends out of the concrete mass and above the shelf 9 and carries at its upper end a drip tank 22 of any suitable construction. Preferably a control valve 23 is located in the pipe 21 below the tank 22 in order to shut off the flow of the chlorinating agent.

It will be observed that the liquid column in the well 20 will tend to maintain itself at the same level as the liquid column in the well 11, that is, at a definite level corresponding to the static head at the weir. The continuous drip of the chlorinating agent from the tank 22 will therefore cause a gradual movement of liquid from the well 20 through the conduit 10 and into the well 11, the extent of this liquid movement depending on the rapidity of flow of the chlorinating agent from the tank 22 which can be regulated in any suitable way to mix the desired quantity of chlorinating agent with the fluid in the pipe.

Another arrangement of the chlorinating device is shown in Fig. 7. The wall 13 of the well 11 is extended above the shelf 9 at 13', and the connection 21' from the tank 22 and valve 23 extends above the shelf and is connected to the well by means of a suitable detachable coupling 24. Since the pressure responsive bulb does not have a fluid-tight fit in the well, the antiseptic fluid passes down through the well around the bulb. The liquid in the well is then placed directly in the path of the antiseptic fluid and a more positive method of mixing the fluid is obtained. This arrangement has the further advantage that it permits a standard construction to be adopted for all manholes, with which the antiseptic device may be used or not as desired, or with which the antiseptic device may be used temporarily and then removed if desired. Where these considerations are important, the arrangement of Fig. 7 may be preferable to that of Fig. 5.

Weirs of the type described are installed at suitable intervals throughout a collection system, and may be firmly grouted or otherwise secured to the sides and bottom of the pipe, or formed or cast integrally with a section of the pipe or with manholes. They offer substantially no obstruction to the flow and the reduction of head and velocity is so small that the line is free from any dead water areas in which solid material can deposit. Due to the inexpensive construction and maintenance of the device it is practicable to install it at intervals as frequent as may be desired whereby engineers in charge of collection systems and the like can determine accurately the condition of the various units of the system and are enabled to meet the requirements of a growing community and of new industries.

As pointed out above, the invention is adapted for use in gravity flow lines not under pressure and normally running less than full, which differ radically from pressure lines as respects measurement of flow. In pressure lines, devices such as orifice plates and Venturi meters are suitable, such devices operating to create differences in pressure at different points in the line from which differences the flow can be determined. Such lines run full at all times that measurements are made. In the case of gravity flow lines, wherein the pipe or conduit normally runs less than full and is not under pressure except that on the sides and bottom due to the weight of the liquid, such measuring devices cannot be used. The present invention is based on the principle of the submerged weir in which, as is well known, the stream or vein of fluid is not completely enclosed being open at the top. Hence it is permissible and in fact highly desirable for facility of measurement that the top of the conduit be open at the weir. Ordinarily, the top of the conduit will therefore be omitted entirely, although removable covers may be provided if considered desirable.

The use of the recording device in combination with the permanent weir installation makes it possible to obtain a continuous record of the flow at the weir and thus provides a continuous record of the amount of liquid flowing in a gravity flow system. A record of this kind provides data invaluable to the proper operation of such a system and necessary in order to provide adequately for future extensions of the system. As stated above, gravity flow systems of the type to which the invention relates are subject to great fluctuations in flow, and the operation of such systems requires a knowledge of daily and hourly maxima. These maxima are also subject to variations due to seasonal influences and to the natural growth of the community which are served so that complete records of the operation of the system are of great assistance to the engineer. Heretofore such complete records have been practically impossible of attainment because it has been considered impracticable to install a flow measuring device permanently in the line. Satisfactory operation of flow measuring devices embodying the invention described above has demonstrated that not only can such a device be installed permanently in a gravity flow system but also that by use of the recording device a complete and continuous record of flow can be kept without the necessity for taking frequent individual measurements. With the addition of the cholorinating device, septic conditions in the well are effectively prevented.

It will be understood that the embodiment of the invention described and illustrated in the drawings is for purposes of illustration only and that the invention is not limited thereto, as various changes in the shape, size and proportion of the various parts will be required under varying conditions of flow and for different types of systems, different forms of pipes, etc. Such variations will be apparent to those skilled in the art and can be made without departing from the spirit of the invention. Reference is therefore to be had to the appended claims for a definition of the limits of the invention. It is to be understood that the term "pipe", as used in these claims, is employed in a broad sense and includes any pipe or conduit, as well as conduit sections constituted by manholes.

What is claimed is:

1. An apparatus whereby the flow of a liquid flowing freely by gravity in a pipe normally running less than full and not under pressure may be measured comprising, in combination with said pipe, means therein forming a weir of the submerged type and including a weir member positioned in the bottom of the pipe and shaped to provide a weir crest conforming to the shape of the adjacent bottom surface of the pipe, and vertical walls at the ends of said weir member, said member being of such limited extent in a direction normal to said surface as substantially to prevent the deposition of solid matter in said pipe.

2. In combination with a gravity flow pipe of the type normally running less than full and not under pressure and wherein a liquid flows freely by gravity, said pipe having non-vertical sides, means in said pipe forming a weir of the submerged type and comprising a weir member positioned in the bottom of the pipe and so limited in vertical extent as to prevent substantially the deposition of solid matter in said pipe, and means forming vertical ends for the weir and merging smoothly and continuously with the sides of the pipe.

3. In combination with a gravity flow pipe of the type normally running less than full and not under pressure and wherein a liquid flows freely by gravity, said pipe having non-vertical sides, means in said pipe forming a weir of the submerged type and comprising a weir member positioned in the bottom of the pipe and shaped to provide a weir crest conforming to the shape of the adjacent bottom surface of the pipe, said member being of such limited extent in a direction normal to said surface as substantially to prevent the deposition of solid matter in said pipe, and means forming vertical ends for the weir and merging smoothly and continuously with the sides of the pipe.

4. In combination with a gravity flow pipe of the type normally running less than full and not under pressure and wherein a liquid flows freely by gravity, said pipe having non-vertical sides, means in said pipe forming a weir of the submerged type and comprising a weir member positioned in the bottom of the pipe and so limited in vertical extent as to prevent substantially the deposition of solid matter in said pipe, and means forming vertical ends for the weir and merging smoothly and continuously with the sides of the pipe, said last named means presenting surfaces at right angles to the direction of flow in the pipe.

5. In combination with a gravity flow pipe of the type normally running less than full and not under pressure and wherein a liquid flows freely by gravity, said pipe having non-vertical sides, means in said pipe forming a weir of the submerged type and comprising a weir member positioned in the bottom of the pipe and shaped to provide a weir crest conforming to the shape of the adjacent bottom surface of the pipe, said member being of such limited extent in a direction normal to said surface as substantially to prevent deposition of solid matter in said pipe, and means forming vertical ends for the weir and merging continuously and smoothly with the sides of the pipe, said last named means presenting surfaces at right angles to the direction of flow in the pipe.

6. A submerged weir device adapted for permanent installation in a gravity flow line and comprising, in combination with a conduit having non-vertical sides, a weir member secured to the bottom of the conduit and shaped to provide a weir crest conforming to the shape of the adjacent bottom surface of the conduit, means having vertical flat surfaces secured to the sides of the conduit and forming ends for the weir, said surfaces extending in a horizontal direction on each side of the weir crest, said vertical surfaces and member defining a three-sided weir, and transition sections on the sides of the conduit adjacent said vertical means and merging smoothly and continuously with the side walls of the conduit, the junctions between said transition sections and means on the up-stream side of the weir forming shoulders to provide end contraction for the weir.

7. A submerged weir device adapted for permanent installation in a gravity flow line and comprising, in combination with a conduit, a weir member positioned in the bottom of the conduit and shaped to provide a curved weir crest conforming to the shape of the adjacent curved bottom surface of the conduit, and means forming vertical flat surfaces at the two ends of said weir member, said flat surfaces extending in a horizontal direction on each side of said weir member, said member being of such limited extent in a direction normal to said bottom surface as to prevent substantially the deposition of solid matter in said conduit, and said vertical walls and curved member defining a three-sided weir.

8. A submerged weir device adapted for permanent installation in a gravity flow line and comprising, in combination with a conduit having non-vertical sides, a weir member secured to the bottom of the conduit and shaped to provide a weir crest conforming to the shape of the adjacent bottom surface of the conduit, said member being of such limited extent in a direction normal to said surface as substantially to prevent the deposition of solid matter in said conduit, and means having vertical flat surfaces forming ends for the weir and merging smoothly and continuously with the sides of the conduit, said flat surfaces extending in a horizontal direction on each side of said member, said last named means and said member defining a three-sided weir.

9. In combination, a gravity flow pipe of the type normally running less than full and not under pressure, a member extending partly around the inner surface of the pipe at its bottom and projecting from the pipe surface, said member having an inner edge conforming in shape to the adjacent inner surface of the pipe, and means extending vertically from both ends of said member and having vertical inner edges, said means and member defining a three-sided weir having parallel vertical sides and an open top.

10. In combination, a gravity flow pipe of the type normally running less than full and not under pressure, said pipe having non-vertical sides, a curved member extending partly around the inner surface of the pipe at its bottom and extending inwardly a uniform distance therefrom, means extending vertically from both ends of said member and secured to the sides of the pipe, said means having vertical inner edges, said means and member defining a three-sided weir having parallel vertical sides and an open top, and means joining each of said vertical means with the walls of the pipe and merging smoothly into said walls.

11. In a manhole structure, a gravity flow conduit passing therethrough and open at the top within said manhole, a mass of material forming the bottom of said manhole through which said conduit passes, and a submerged weir device in said conduit within said manhole comprising a weir member and vertical end members for the weir, said material being molded to form portions of said weir device.

12. In a manhole structure, a gravity flow pipe passing therethrough and open at the top within said manhole, a mass of material forming the bottom of said manhole in which said pipe is embedded, and a submerged weir device in said pipe comprising a weir member and vertical end members, said material extending within said pipe and being molded therein to form portions of said weir device.

13. In a manhole, the combination of a gravity flow conduit extending therethrough and having non-vertical sides, the upper portion of said conduit being removed within said manhole, a mass of material in the bottom of the manhole through which said conduit passes, said material forming at least part of the wall of said conduit, and a submerged weir device in said conduit comprising a weir member, vertical end members, and transition sections extending from said end members to the sides of the conduit and merging smoothly with the latter, said material being shaped to form portions of said weir device.

14. In a manhole structure, a gravity flow conduit passing therethrough and open at the top within said manhole, a mass of material forming the bottom of said manhole through which said conduit passes, a submerged weir device in said conduit within said manhole, a well formed in said material adjacent said weir and having a connection with the fluid stream passing over said weir, and a recording device operative in accordance with the height of the liquid column in said well.

15. In a manhole structure, the combination of a gravity flow conduit passing therethrough and open at the top within said manhole, a mass of material in the bottom of said manhole through which said conduit passes, a submerged weir device in said conduit comprising a weir member and vertical end members, a well formed in said mass adjacent said weir, a passage formed in said mass connecting the bottom of the well with the fluid stream, a pressure responsive element in said well, and a recording gauge connected with said element.

16. In a manhole structure, the combination of a gravity flow conduit passing therethrough and open at the top within said manhole, a mass of material in the bottom of said manhole through which said conduit passes, a submerged weir device in said conduit comprising a weir member and vertical end members having cross-stream faces providing end contraction for the weir, a well formed in said mass adjacent the weir, a passage formed in said mass and connecting the bottom of the well with the fluid stream, said passage opening in a downstream direction with the opening on the down-stream face of one of said end members, and a recording device responsive to the height of the liquid in said well.

17. In combination with a gravity flow pipe of the type normally running less than full and not under pressure, said pipe having non-vertical sides, means in said pipe forming a weir of the submerged type and comprising a weir member positioned in the bottom of the pipe and so limited in vertical extent as to prevent substantially the deposition of solid matter in said pipe, means forming vertical ends for the weir and merging smoothly and continuously with the sides of the pipe, a vertical well having a connection with said pipe at a point adjacent the weir, and a recording device responsive to the height of the liquid in said well.

18. In combination with a gravity flow pipe of the type normally running less than full and not under pressure, said pipe having non-vertical sides, means in said pipe forming a weir of the submerged type and comprising a weir member positioned in the bottom of the pipe and so limited in vertical extent as to prevent substantially the deposition of solid matter in said pipe, means forming vertical ends for the weir and merging smoothly and continuously with the sides of the pipe, said last-named means having cross-stream faces providing end contraction for the weir, a vertical well, a conduit connecting said well with said pipe and having an opening on one of said faces in a down-stream direction, and a recording device responsive to the height of liquid in said well.

19. In combination, a gravity flow pipe of the type normally running less than full and not under pressure, a weir member extending partly around the inner surface of the pipe at its bottom and projecting from the pipe surface, said member having an inner edge conforming in shape to the adjacent inner surface of the pipe, means extending vertically from both ends of said member and having vertical inner edges, said means and member defining a three-sided weir having parallel vertical sides and an open top, a well having a connection with said pipe at a point adjacent the weir, and a recording device responsive to the height of the liquid in said well.

20. In combination with a gravity flow pipe of the type normally running less than full and not under pressure, said pipe having substantially circular cross-section, a weir member shaped substantially as an arc of a circle and positioned in the bottom of the pipe, the chord subtended by said arc being not more than approximately two-thirds the diameter of the pipe, said member projecting from the pipe surface a distance approximately one-fourth of the rise of the weir member from the bottom of the pipe, and means extending vertically from both ends of the weir member and forming vertical weir ends, said means merging smoothly with the sides of the pipe.

INGARD M. CLAUSEN.